(12) United States Patent
Tobioka (10) Patent No.: US 6,477,325 B1
(45) Date of Patent: Nov. 5, 2002

(54) LENS-FITTED PHOTO FILM UNIT WITH LENS POSITION CHANGING DEVICE

(75) Inventor: Takashi Tobioka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/722,016

(22) Filed: Nov. 27, 2000

(30) Foreign Application Priority Data

Dec. 3, 1999 (JP) ............................................ 11-344291

(51) Int. Cl.[7] ........................ G03B 17/02; G03B 15/02; G03B 17/00; G03B 3/00; G03B 13/00
(52) U.S. Cl. .............................. 396/6; 396/62; 396/73; 396/103
(58) Field of Search ................................. 396/6, 61, 62, 396/73, 176, 103; 366/459, 179

(56) References Cited

U.S. PATENT DOCUMENTS 4,710,013 A * 12/1987 Wong ........................... 396/98
5,634,163 A * 5/1997 Kamata ....................... 396/458

* cited by examiner

*Primary Examiner*—David M. Gray
*Assistant Examiner*—Rochelle Blackman
(74) *Attorney, Agent, or Firm*—Young & Thompson

(57) ABSTRACT

A lens holder for holding a taking lens is fitted in a lens barrel rotating and shifting. The lens barrel is provided with cams respectively inserted in pins of the lens holder. Each of the cams has a short-distance cam groove and a long-distance cam groove, and an oblique cam groove that connects the above mentioned cams. A flash selection switch slidable between an ON position and an OFF position. When the flash selection switch is in the OFF position, the pins are respectively located on the long-distance cam groove, so that the taking lens is set on a long-distance lens position to perform a daylight photography with pan-focus. When the flash section switch is slid to the ON position, the lens holder rotates by one of the pins. When the lens holder rotates, each of the pins respectively enters the short-distance cam groove and the taking lens is set on a short-distance lens position. The taking lens is focused on a short-distance zone to perform a flash photography. In the flash photography, if subject brightness is high, a stop plate enters a photographic light path to set a small stop aperture.

10 Claims, 7 Drawing Sheets

LENS-FITTED PHOTO FILM UNIT WITH LENS POSITION CHANGING DEVICE

BACKGROUND OF THE INVENTION

1. Field of the Invention

The present invention relates to a lens-fitted photo film unit previously loaded with a photo film, more particularly to a lens-fitted photo film unit changeable in position of a taking lens depending upon a flash photography mode or a daylight photography mode.

2. Description of the Prior Art

As is well known, there is a lens-fitted photo film unit that facilitates taking photographs for any user. At a manufacturing plant, the lens-fitted photo film unit is previously loaded with a photo film being unexposed, and has a simple exposure mechanism. And some types of the lens-fitted photo film unit for retail sale respectively built-in a flash device so that it is possible to take photographs even at night or in rear light. The lens-fitted photo film unit having the flash device is provided with a flash selection switch that makes external operation possible. If the flash selection switch is slid from an OFF position to an ON position, a flash photography mode is selected so that the flash device emits flash light synchronized with a shutter.

The lens-fitted photo film unit has a fixed focus taking lens, which has one or two lens elements. In a daylight photography mode where the flash device is unused, it is possible to take the photographs at various subject distances from a short distance like a portrait to a long distance like a landscape photograph. To cover the wide field of the subject distances, the taking lens having a short focal length and a large f-number (aperture value) is used to perform pan-focus.

A range of distance at which a subject can be lit up by the flash device depends on a guide number, which is generally determined within the range of approximately 3 to 4 meters. In the flash photography, a main subject is usually a person, so that it is necessary to take sharper photographs. However, as the pan-focus is performed with the taking lens, it is inevitable that sharpness of an image being obtained by the flash photography becomes insufficient to some extent.

SUMMARY OF THE INVENTION

In view of the foregoing, an object of the present invention is to provide a lens-fitted photo film unit for taking sharp photographs especially in a flash photography.

Another object of the present invention is to provide a lens-fitted photo film unit for obtaining suitable sharpness in wide field in a daylight photography.

A further object of the present invention is to provide a lens-fitted photo film unit changeable in size of a stop aperture depending upon a flash photography mode or a daylight photography mode.

The above and other objects can be accomplished by shifting a taking lens in response to operation of a flash selection member, and setting an objective focal point in the flash photography mode to a short distance compared with an objective focal point in the daylight photography mode. In the flash photography mode, the lens-fitted photo film unit is focused on a short-distance zone, so that sharpness of such an image of a person lit up by flash light becomes high. In contrast with that, in the daylight photography mode where a flash device is unused, pan-focus keeps the sharpness of the image suitably in the wide range from the short distance to a long distance.

In the embodiments of the present invention, a stop changing device is disposed for selecting a small stop aperture in the daylight photography mode or a large stop aperture in the flash photography mode in response to the operations of the flash selection member. In the flash photography mode of another preferred embodiment of the present invention, the small stop aperture is selected if subject brightness is above a predetermined level, and the large stop aperture is selected if he subject brightness is below the predetermined level.

According to the present invention, in the flash photography mode, the taking lens is shifted to a suitable position for focusing on the short-distance zone, so that the sharpness of the image of a person to be important can be high. The taking lens needs no extra operation and has a simple structure as is shifted in response to the flash selection member. Further in the flash photography mode, as the stop aperture can be changed for one having a suitable size corresponding to the subject brightness, exposure amount on a person in rear light is appropriate, and the exposure amount on a person within the short-distance zone appropriate in the flash photography at night.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
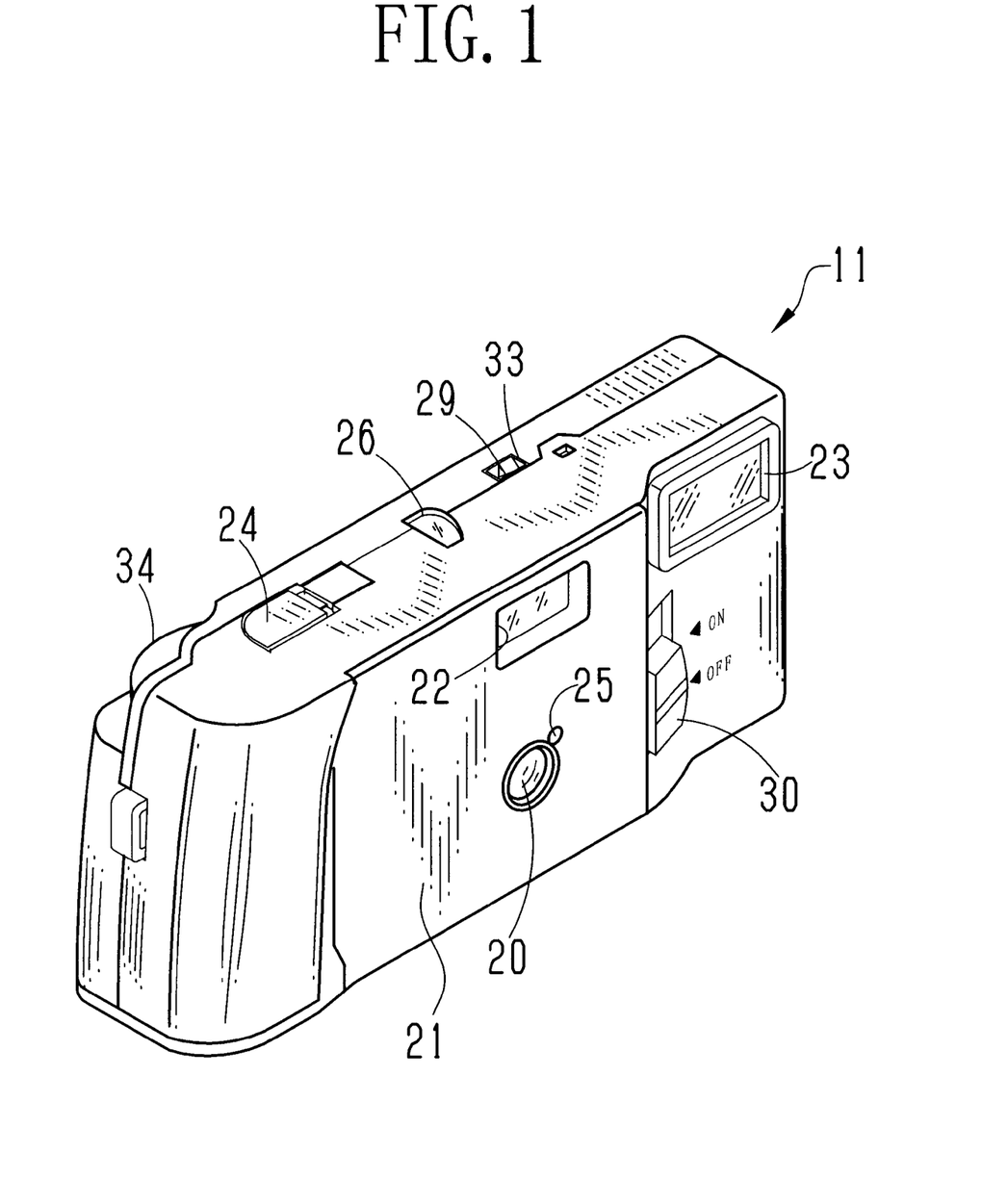
FIG. 1 is a perspective view of a lens-fitted photo film unit of the present invention.

In FIG. 1, a front face of a lens-fitted photo film unit 11 is provided with a taking lens 20, a finder objective window 22, a photometric window 25, a flash emitter window 23 and a flash selection switch 30. When the flash selection switch 30 is slid downwards to an OFF position, a daylight photography mode is selected so that a flash device is not actuated. When the flash selection switch 30 is slid upwards to an ON position, a flash photography mode is selected.

Particularly in the flash photography mode, flash device emits flash light through the flash emitter window 23 toward a subject synchronized with a shutter.

A shutter release button 24 and a frame counter window 26 are mounted on a top of the lens-fitted photo film unit 11. And an opening 33 is further mounted thereon where a light guide 29 protrudes when the flash photography mode is selected. A winding wheel 34 is partially protruded from a rear of the lens-fitted photo film unit 11 and manually rotated so that filmstrip is wound up and a shutter mechanism is charged up.

Figure 2:
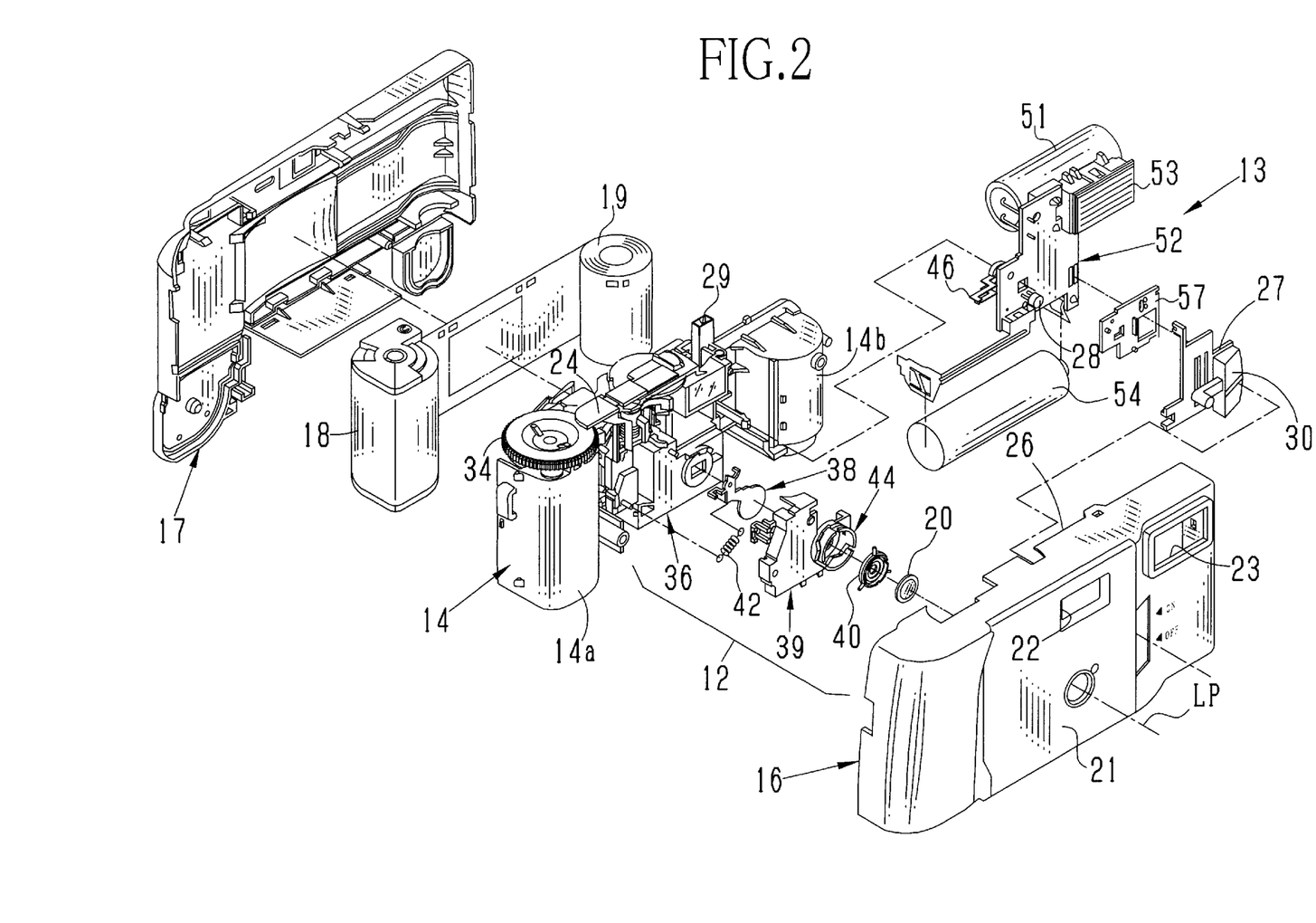
FIG. 2 is an exploded perspective view of the lens-fitted photo film unit shown in FIG. 1.

In FIG. 2, the lens-fitted photo film unit 11 has a main body 14, and both a front cover 16 and a rear cover 17 for covering forward and rearward from the main body 14. The main body 14 is provided with a cartridge chamber 14a and a film chamber 14b which a cartridge 18 and a roll of unexposed photo filmstrip 19 a respectively loaded at a manufacturing plant in advance. An exposure unit 12 and a flash device 13 are attached in front of he main body 14. Additionally, the exposure unit 12 is provided with a shutter blade 38, the taking lens 20 and the other parts.

Figure 3:
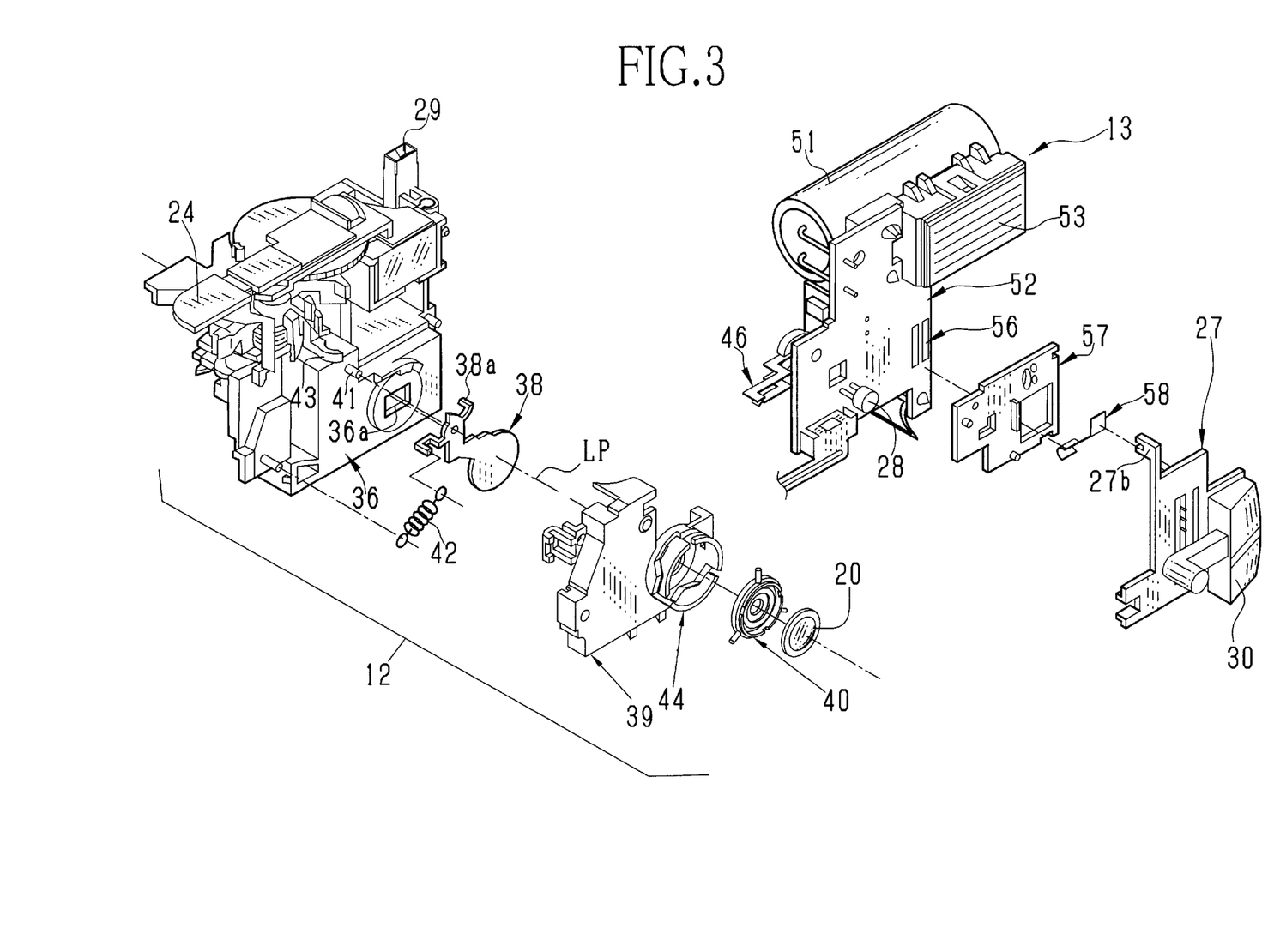
FIG. 3 is an exploded perspective view of an exposure unit.

As is shown in FIG. 3 is more detail, the flash device 13 has a circuit board 52. A main capacitor 51, a synchronized flash trigger switch 46, a light-emitting diode (LED) for indicating completion of charge, a booster coil and the other elements are soldered to a lead pattern of the circuit board 52. Besides, a battery 54 and a flash light-emitting unit 53 are mounted on the circuit board 52. Furthermore, the circuit board 52 is provided with a plural number of holes. By fitting pins protruded from the main body 14 in these holes, the circuit board 52 is attached to the main body 14. At that time, the flash light-emitting unit 53 is fitted in the flash emitter window 23 of the front cover 16. A receiver plate 57 is placed in front of the circuit board 52 with a suitable interval. A switch plate 27 disposed integrally with the flash selection switch 30 is slidably secured to the receiver plate 57.

Figure 7:
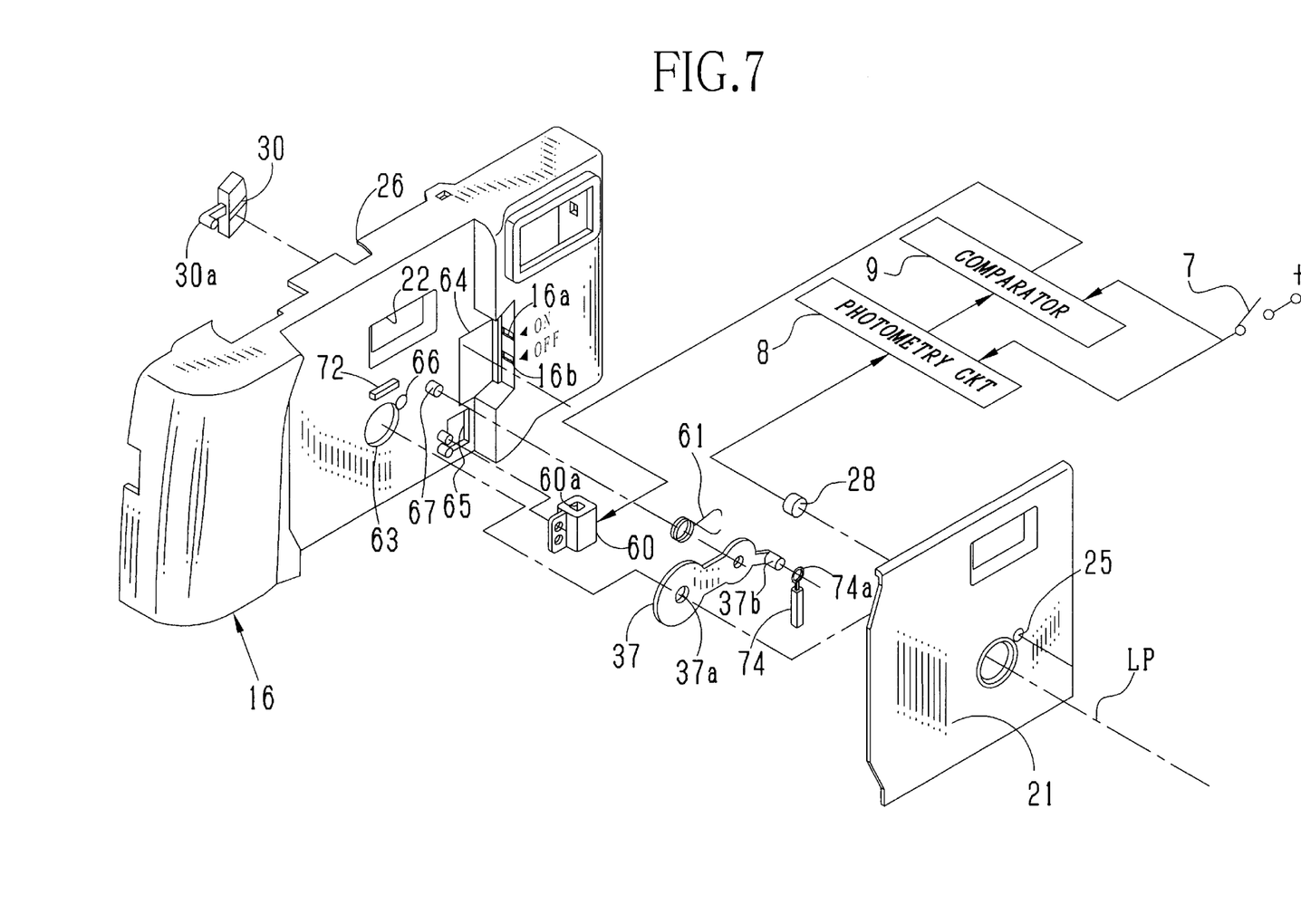
FIG. 7 is an exploded perspective view illustrating a stop changing device.

The front face of the circuit board 52 is also provided with a photo sensor 28, which receives light from the subject passing through the photometric window 25. For the photo sensor 28, it is possible to use such elements as cadmium sulfide (CdS), cadmium selenide (CdSe) or a photodiode that change resistance values thereof corresponding to amount of received light, or a photoelectric cell that causes electromotive force corresponding to the amount of the received light. As shown in FIG. 7, the photo sensor 28 is connected to a photometry circuit 8, which measures subject brightness. A signal of the subject brightness measured by the photometry circuit 8 is transmitted to a comparator 9 for judging whether the subject brightness goes above a predetermined level or not. If the subject brightness is above the predetermined level, an electromagnet 60 is activated.

The battery 54 feeds the photometry circuit 8 and the comparator 9 through a switch 7 that is turned on by depressing the shutter release button 24 halfway. Additionally, it is preferable to dispose a flash charge switch, which is turned on if the flash selection switch 30 is in the ON position. The flash charge switch is serially connected to a switch 7. The flash charge switch activates the photometry circuit 8, the comparator 9 and the electromagnet 60 only in the flash photography mode. Thereby, it is possible to prevent the battery 54 from being wasted in the daylight photography mode.

A switch contact projection 58 is attached to a rear face of the switch plate 27, and a free end thereof passes through an opening 57a of the receiver plate 57 and is slidably contacted with the front face of the circuit board 52. The switch contact projection 58 and a switch pattern 56 constitute a flash photography mode switch. When the flash selection switch 30 is in the ON position, as the switch plate 27 goes up and the switch contact projection 58 is contacted with the switch pattern 56 of the circuit board 52, the flash photography mode switch is turned on. If the flash photography mode switch is turned on, the flash photography mode is selected, with the result that the main capacitor 51 starts charging. And the light guide 29 goes up by means of an arm 27b integrated with an upper end of the switch plate 27, and a tip of the light guide 29 protrudes from the opening 33 of the rear cover 17. Then, when the charge of the main capacitor 51 is completed, LED (not shown) is turned on and the tip of the light guide 29 is brightly lit up to indicate the completion of the charge of the main capacitor 51.

A dark box base frame 36 is formed integrally with the exposure unit 12, and a shutter opening 36a is formed in front of the dark box base frame 36. The shutter opening 36a is opened and closed by the shutter blade 38 where a pivot 41 is fitted. The shutter blade 38 is covered with a shutter cover 39. By means of film winding operation, a kick lever 43 is set on a charging position and contacted with a part of the shutter release button 24. When the shutter release button 24 is fully depressed, the kick lever 43 is released. The kick lever 43 rotates toward a rest position by a spring (not shown), and kicks the shutter blade 38 at the head during the rotational movement. The shutter blade 38 rotates in a clockwise direction against biasing force of a return spring 42, and opens the shutter opening 36a. Immediately after that, the shutter blade 38 goes back to a closing position by the return spring 42. Throughout the operation of opening and closing the shutter blade 38, one exposure operation is performed. Also, when the shutter opening 36a is fully opened by the shutter blade 38, a push projection 38a turns on the synchronized flash trigger switch 46. In the flash photography mode, the flash device 13 emits the flash light through the flash emitter window 23 by discharging the main capacitor 51.

Figure 4:
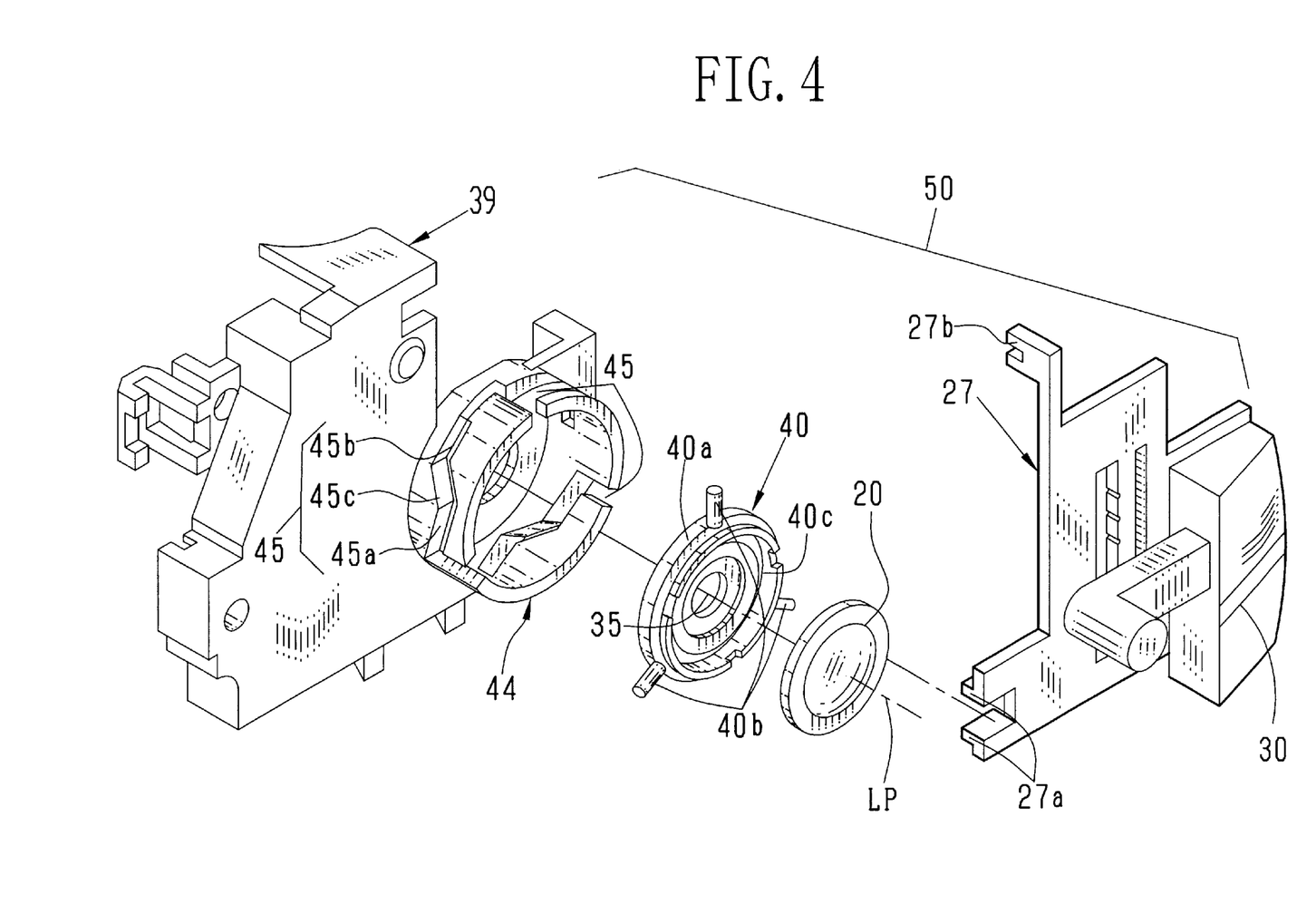
FIG. 4 is an exploded perspective view of a lens position changing device.

As shown in FIG. 4, a lens position changing device 50 is constituted of a lens barrel 44, a lens holder 40, the taking lens 20 and the switch plate 27. The shutter cover 39 is formed with the lens barrel 44. The lens holder 40 is constituted of a main portion 40a that is shaped in a cylinder, and three pins 40b that are disposed on the periphery of the main portion 40a at regular intervals. A lens-receiver portion 40c is formed in front of the main portion 40a, and the taking lens 20 is fitted in the lens-receiver portion 40c.

One of the three pins 40b is squeezed by a fork member 27a being formed integrally with the switch plate 27. When the flash selection switch 30 is slid upwards or downwards, the lens holder 40 rotates inside the lens barrel 44 about a photographic optical axis (an optical axis of the taking lens 20) LP by means of the fork member 27a.

Figure 5:
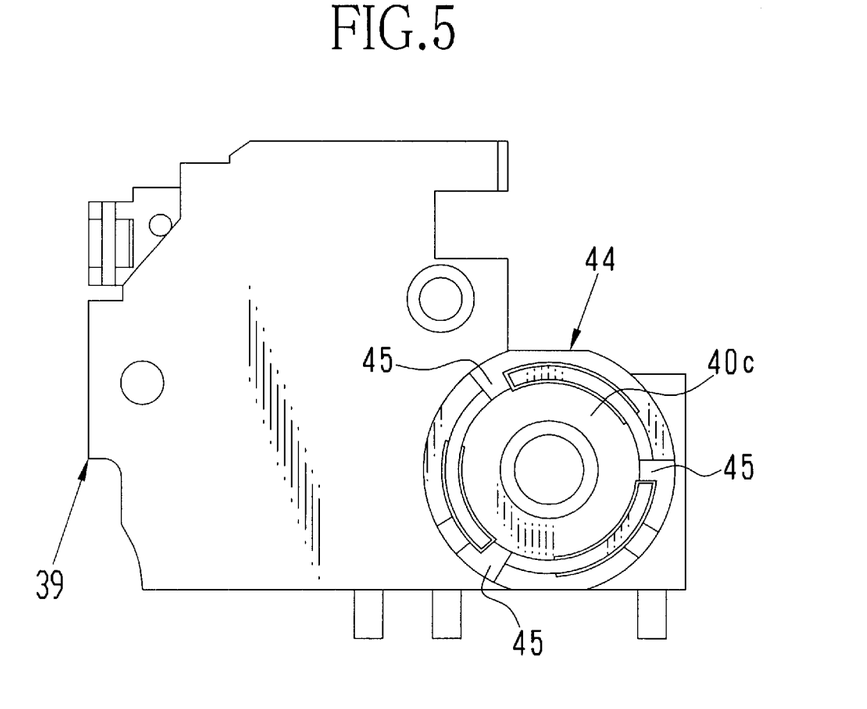
FIG. 5 is a front view of a shutter cover.

As shown in FIG. 5, the lens barrel 44 is provided with three cams 45 opposed to the three pins 40b. Each of the cams 45 sets the taking lens 20 selectively on a short-distance lens position or on a long-distance lens position. The short-distance lens position is defined as a position where the taking lens 20 is focused on a short-distance zone (within approximately 3–4 m) suitable for a flash photography. And in he long-distance lens position where pan-focus is performed, the taking lens 20 is focused on a wide range from a short distance to a long distance. Therefore, in the long-distance lens position, it is slightly difficult to take photographs of an object within the short-distance zone in a sharply focused manner relative to the short-distance lens position.

Figure 6:
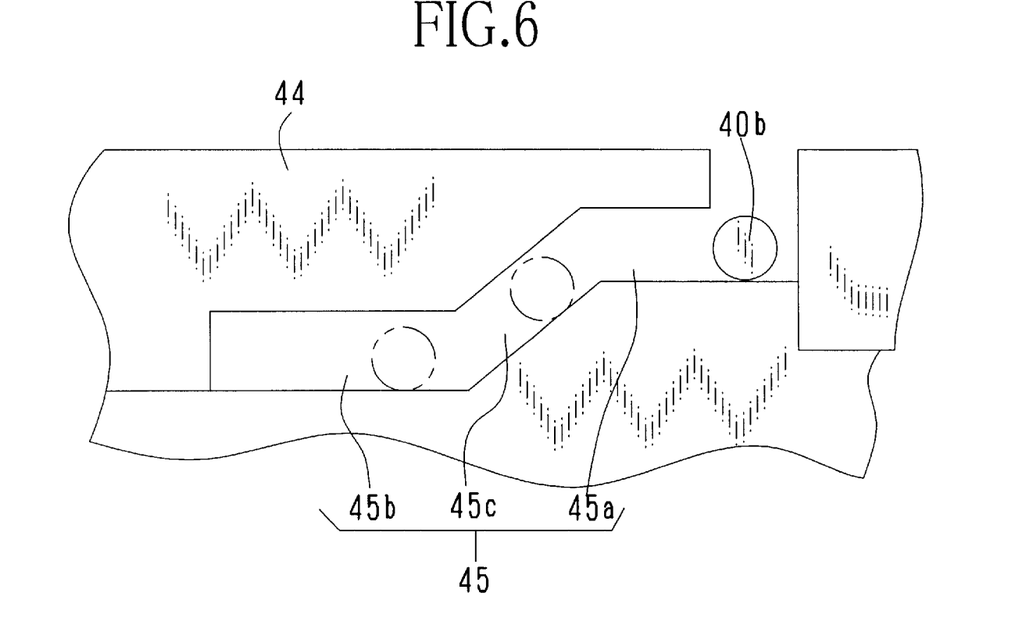
FIG. 6 is an explanatory view illustrating cams of a lens barrel.

As shown in FIG. 6, each of the cams 45 is constituted of a short-distance cam groove 45a, a long-distance cam groove 45b and an oblique cam groove 45c. The short-distance cam groove 45a and the long-distance cam groove 45b are disposed perpendicularly to the photographic optical axis LP. When the lens holder 40 rotates in the lens barrel 44 in response to the flash selection switch 27, combinations of the pins 40b and the cam 45 force the lens holder 40 to rotate and move along the photographic optical axis LP. When the pins 40b are positioned within the short-distance cam groove 45a, the lens holder 40 is extended from the lens barrel 44 to set the taking lens 20 on the short-distance lens position. And when the pins 40b are positioned within the long-distance cam groove 45b, the taking lens 20 is set on the long-distance lens position. The oblique cam groove 45c is used for connecting both cam grooves 45a and 45b.

As shown in FIG. 7, a panel 21 is placed in front of the front cover 16 with a suitable interval. A stop plate 37, the electromagnet 60, a spring 61 and the other members are disposed inside the interval. These members and the flash selection switch 30 constitute a stop changing device. The front cover 16 is provided with an opening 63 for guiding the subject light to the dark box base frame 36. The opening 63, which is generally served as an open aperture-stop, is referred to as "large stop aperture" in the present specification. Besides that, the front cover 16 has an opening 64 for the flash selection switch 30, an opening 65 for containing the electromagnet 60, an opening 66 for the photo sensor 28 and the other parts.

Still more, as a second projection member (not shown) is disposed on one side of the flash selection switch 30 and engaged with one of cutouts 16a and 16b of the front cover 16, the flash selection switch 30 clicks stopped on either one of the OFF position or the ON position.

The stop plate 37 has a small stop aperture 37a and a pin 37b and swingably fits on a pivot 68 of the front cover 16. An end 74a of an actuator 74 is connected to the pin 37b. By means of the actuator 74, the stop plate 37 swings about the pivot 68. The spring 61 connects a projection member 30a of the flash selection switch 30 with the pin 37b of the stop plate 37. When the flash selection switch 30 is moved, the spring 61 is charged to give the stop plate 37 biasing force.

The stop plate 37 is abutted on a stopper 72 when the flash selection switch 30 is in the OFF position. At that time, the small stop aperture 37a is set on the photographic optical axis LP. By sliding the flash selection switch 30 to the ON position, the small stop aperture 37a is retracted from the photographic optical axis LP. At that time, the large stop aperture 63 is used to perform the photography.

The electromagnet 60 is contained in the opening 65 and is secured by pins of the front cover 16. The actuator 74 is inserted in an opening 60a being provided through the center of the electromagnet 60. Both the actuator 74 and the electromagnet 60 constitute a solenoid, so that the actuator 74 is drawn into the electromagnet 60 while the electromagnet 60 is activated. In response to the activation of the electromagnet 60, the stop plate 37 is set on the photographic optical axis LP.

Figure 8A:
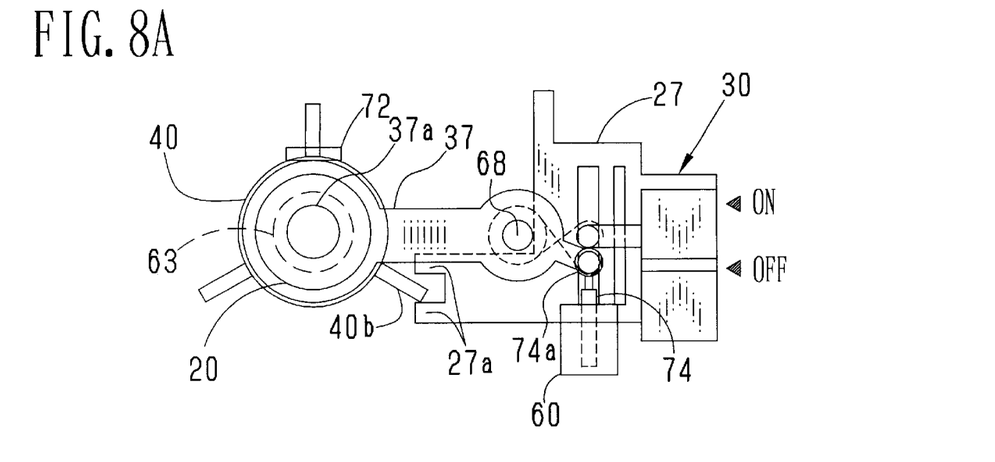
FIG. 8A is an explanatory view illustrating a position of a stop plate in a daylight photography mode.
Figure 8B:
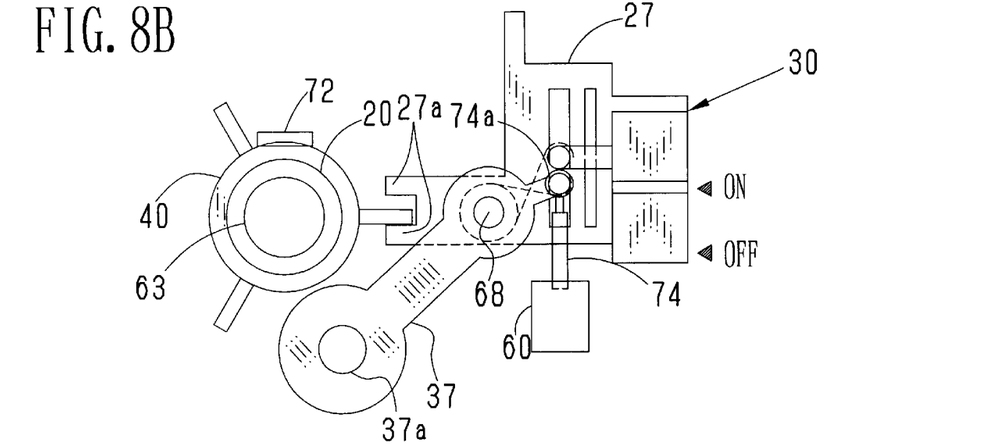
FIG. 8B is an explanatory view of a stop changing device in flash photography mode on condition that light from a subject is weak.
Figure 8C:
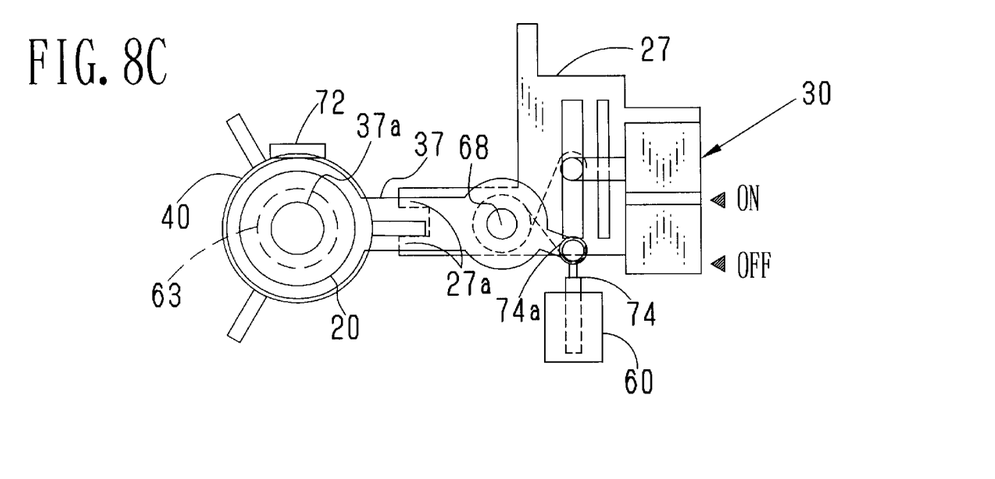
FIG. 8C is an explanatory view illustrating of a stop changing device in a flash photography mode on condition that light from a subject is bright.

The following is about operations of the above embodiment, according to FIG. 8A through FIG. 8C. The winding wheel 34 is rotated to perform the winding operation of one frame of the photo filmstrip 19. In the course of winding the photo filmstrip 19, the kick lever 43 is set on the charging position.

A photographer makes a decision whether the flash photography should be performed or not, according to a scene.

In such a case that the subject brightness is high in fine weather, an outdoor photography does not need to use the flash device 13. Therefore, as shown in FIG. 8A, the flash selection switch 30 is slid to the OFF position for the daylight photography mode. At that time, the fork member 27a of the switch plate 27 rotates the pins 40b in the clockwise direction, and each of the pins 40b enters the long-distance cam groove 45b. Simultaneously, the lens holder 40 draws back to the inside of the lens barrel 44, and the taking lens 20 is set on the long-distance lens position. Additionally, the small stop aperture 37a is set on the photographic optical axis LP.

Although the switch 7 is turned on while the shutter release button 24 is depressed halfway, the electromagnet 60 remains turned off because of the high subject brightness. Thus the small stop aperture 37a also remains on the photographic optical axis LP. When the shutter release button 24 is further depressed, the lock on the kick lever 43 is released. As the kick lever 43 kicks the shutter blade 38 at the head, the shutter blade 38 is starts moving for exposure. Photographic light, which has entered through the taking lens 20, passes through the small stop aperture 37a, enters the dark box base frame 36 from the shutter opening 36a in a state of the opening operation, and makes an exposure on the photo filmstrip 19 being set on an exposure position. When the shutter blade 38 is completely retracted from the shutter opening 36a to reach a position where the shutter opening 36a is fully opened, the push projection 38a turns on the synchronized flash trigger switch 46. Yet the flash emitter window 23 does not emit the flash light in the daylight photography mode. After the shutter opening 36a is fully opened, the closing operation of the shutter is started by means of the spring 42. Then the shutter blade 38 fully closes the shutter opening 36a to terminate the exposure of the photo filmstrip 19. To take the next photograph, the winding wheel 34 is operated for winding the photo filmstrip 19 by a frame and charging the shutter mechanism.

Since under-exposure occurs in a dark scene such as out of doors at night or in the door, the flash light is needed. A range where the flash light can illuminate is the short-distance zone within approximately 3–4 m. As shown in FIG. 8B, the flash selection switch 30 is slid to the ON position for the flash photography mode. As a flash photography mode switch is turned on by the switch plate 27, the battery 54 starts charging the main capacitor 51.

As the fork member 27a of the switch plate 27 rotates the pins, 40b in a counterclockwise direction, each of the pins 40b passes through the oblique cam groove 45c and enters the short-distance cam groove 45a, thereby the lens holder 40 is protruded into the subject side. The taking lens 20 is set on the short-distance lens position. Also, the stop plate 37 involved with the movement of the flash selection switch 30 rotates in the counterclockwise direction about the pivot 68 and retracted from the photographic light path. Following the rotational movement of the stop plate 37, a portion of the actuator 74 is pulled up out of the electromagnet 60.

Secondly, when the shutter release button 24 is depressed halfway, the switch 7 is turned on to start photometry with the photometry circuit. If the scene is weak, the subject brightness is below the predetermined level, and then output of the comparator 9 is "L". At that time, the electromagnet 60 is not activated. Therefore, as shown in FIG. 8B, the stop plate 37 remains retracted from the photographic light path.

When the shutter release button 24 is fully depressed, as mentioned above, the shutter blade 38 is opened. The photographic light entering through the taking lens 20 passes the large stop aperture 63, and starts the exposure on the photo filmstrip 19. When the shutter blade 38 reaches the full opened position, the synchronized flash trigger switch 46 is turned on to discharge the main capacitor 51 instantaneously. The flash emitter window 23 emits the flash light to perform the flash photography.

When a portrait is taken under rear light, a face of the peron is under-exposure, but exposure amount of a background becomes appropriate. For the rear light scene, it is appropriate to perform daylight-synchronized photography with the flash light as fill-in light. By sliding the flash selection switch 30 to the ON position, the flash photography mode is selected. As described heretofore, the taking lens 20 is set on the short-distance lens position, and the stop plate 37 is retracted from the photographic light path.

When the shutter release button 24 is depressed halfway, the photometry is started. As the subject brightness is above the predetermined level, the output of the comparator 9 is "H" and the electromagnet 60 is activated. Thereby, as shown in FIG. 8C, the actuator 74 is drawn into the electromagnet 60 against the biasing force of the spring 61. The stop plate 37 rotates in the clockwise direction about the pivot 68, and sets the small stop aperture 37a on the photographic light path.

When the shutter release button 24 is fully depressed, the flash photography is performed with the small stop aperture 37a. As the face of the person as a main subject is lit up with the flash light, it is possible to take the photographs while exposure amount from the face of the person is kept almost appropriate as well as the exposure amount from the background. The taking lens 20 is focused on the short-distance zone illuminatable with the flash light, thus an image of the person recorded on the photo filmstrip 19 is in sharp focus.

In the present embodiments, the taking lens is shifted between the short-distance lens position and the long-distance lens position (a pan-focus lens position), yet it is additionally possible to shift the taking lens between a macro lens position (a lens position for a close-up photography) and a normal-distance lens position (a pan-focus lens position). Besides that, the positions of the taking lens can be switched between a normal-distance lens position (a pan-focus lens position) and a far-distance lens position (optical infinity, where a range thereof is approximately 15–20 m, or another lens position for focusing the taking lens on a landscape farther than the optical infinity).

Additionally, although the pins 40b are disposed on three spots in the periphery of the lens holder 40, it is possible to change the number of the pins 40b suitably. And in the flash photography mode, either a small stop aperture or a large stop aperture is selected in accordance with the subject brightness. Yet it is alternatively possible to use the large stop aperture all the time in the flash photography mode by omitting the photometry circuit.

It should also be understood that the foregoing relates to only preferred embodiments of the invention, and that it is intended to cover all changes and modifications of the example of the invention herein chosen for the purposes of the disclosure, which do not constitute departures from the spirit and scope of the invention.

What is claimed is:

1. A lens-fitted photo film unit that is previously loaded with a photo film, and includes a flash device which emits flash light synchronized with a shutter and a taking lens which forms an image of a subject on said photo film, said lens-fitted photo film unit comprising:

a flash selection member changeable between an ON position where said flash device is activated and a flash photography is performed with said flash light, and an OFF position where said flash device is inactivated and a daylight photography is performed without using said flash light;

a lens position changing device for moving said taking lens along an optical axis in response to said flash selection member for setting said taking lens on one of a first lens position and a second lens position, wherein said taking lens is set on said first lens position in said flash photography and said taking lens is set on said second lens position in said daylight photography, such that a distance between said first lens position and said photo film is longer than that between said second lens position and said photo film;

a stop changing device that selects one of a small stop aperture and a large stop aperture based on a current setting of the flash selection member and a control circuit;

wherein if the flash selection member is in the OFF position, the control circuit sets said small stop aperture; and wherein if the flash selection member is in the ON position, the control circuit is constructed to control the aperture by setting the small stop aperture if subject brightness is above a predetermined level, and setting said large stop aperture if said subject brightness is below said predetermined level.

2. A lens-fitted photo film unit as claimed in claim 1, said lens position changing device comprising:

a lens holder for holding said taking lens;

a plural number of pins protruding from the periphery of said lens holder;

a fixed lens barrel for fitting said lens holder, said lens holder rotating in said fixed lens barrel in response to said flash selection member; and a plural number of cams provided to said lens barrel oppositely to said respective pins, each of said cams having a first cam groove and a second cam groove that are perpendicular to said optical axis and an oblique cam groove that connects said first cam groove and said second cam groove, said taking lens being set on said first lens position while each of said pins is positioned in said first cam groove, and said taking lens being set on said second lens position while each of said pins is positioned in said second cam groove.

3. A lens-fitted photo film unit as claimed in claim 2, wherein said flash selection member is slidable, and includes a fork member squeezing one of said pins.

4. A lens-fitted photo film unit as claimed in claim 1, wherein said taking lens performs pan-focus in said second lens position, and said taking lens is focused on a short-distance zone sufficiently illuminatable with said flash light in said first lens position.

5. A lens-fitted photo film unit as claimed in claim 4, wherein said stop changing device includes a stop plate that is inserted in and retracted from an optical axis of said taking lens, and said small stop aperture is provided to said stop aperture, such that said large stop aperture is used while said stop plate is retracted from said optical axis of said taking lens.

6. A lens-fitted photo film unit as claimed in claim 4, said control circuit comprising:

a photometry circuit for measuring said subject brightness to output a measured signal;

a comparator for generating a driving signal if said measured signal goes above a predetermined level; and an electromagnetic force generator for actuating said stop plate to be set on said optical axis of said taking lens in accordance with said driving signal.

7. A lens-fitted photo film unit as claimed in claim 6, further comprising a switch being turned on in response to the operation of said shutter release button for activating said control circuit.

8. A lens-fitted photo film unit as claimed in claim 7, further comprising a stopper for receiving said stop aperture while said stop aperture is moved by said electromagnetic force generator for positioning said small stop aperture correctly on said optical axis of said taking lens.

9. A lens-fitted photo film unit as claimed in claim 8, wherein said electromagnetic force generator includes an armature being connected to said stop plate, and an electromagnet for forcing said armature to move with electromagnetic force.

10. A lens-fitted photo film unit as claimed in claim 9, further comprising a coil spring for biasing said stop plate, wherein an end of said coil spring is connected to said stop plate and the remaining end of said coil spring is connected to said flash selection member.

* * * * *